United States Patent
Przygodda et al.

(10) Patent No.: US 11,067,390 B2
(45) Date of Patent: Jul. 20, 2021

(54) METHOD FOR GAUGING SURFACES WITH CLASSIFICATION OF MEASUREMENTS AS VALID OR NON-VALID

(71) Applicant: HEXAGON TECHNOLOGY CENTER GMBH, Heerbrugg (CH)

(72) Inventors: Frank Przygodda, Lindau (DE); Thomas Jensen, Rorschach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 16/784,141

(22) Filed: Feb. 6, 2020

(65) Prior Publication Data
US 2020/0256671 A1    Aug. 13, 2020

(30) Foreign Application Priority Data
Feb. 7, 2019 (EP) ..................... 19156061

(51) Int. Cl.
*G01B 11/30* (2006.01)
*G01B 9/02* (2006.01)

(52) U.S. Cl.
CPC ........ *G01B 11/303* (2013.01); *G01B 9/02091* (2013.01)

(58) Field of Classification Search
CPC ................... G01B 11/303; G01B 9/02091
See application file for complete search history.

(56) References Cited

U.S. PATENT DOCUMENTS

| 5,388,342 A | 2/1995 | Garau et al. |
| 5,402,582 A | 4/1995 | Raab |
| 2010/0312524 A1* | 12/2010 | Siercks ............... G01B 11/005 703/1 |
| 2016/0123720 A1* | 5/2016 | Thorpe ............. G01B 9/02007 356/498 |

FOREIGN PATENT DOCUMENTS

| DE | 4325337 A1 | 2/1994 |
| DE | 4325347 A1 | 2/1994 |
| EP | 1 744 119 A1 | 1/2007 |
| EP | 1 474 650 A2 | 6/2007 |

OTHER PUBLICATIONS

European Search Report in Application No. 19156061.4 dated May 6, 2019.

* cited by examiner

*Primary Examiner* — Dominic J Bologna
(74) *Attorney, Agent, or Firm* — Maschoff Brennan

(57) ABSTRACT

A method for measurement of a surface, in particular according to the principle of Optical Coherence Tomography, whereby distances to points of the surface are measured based on interferograms and classifying of measurements as non-valid or valid based on evaluation of phase change or amplitude change of a respective interferogram.

15 Claims, 5 Drawing Sheets

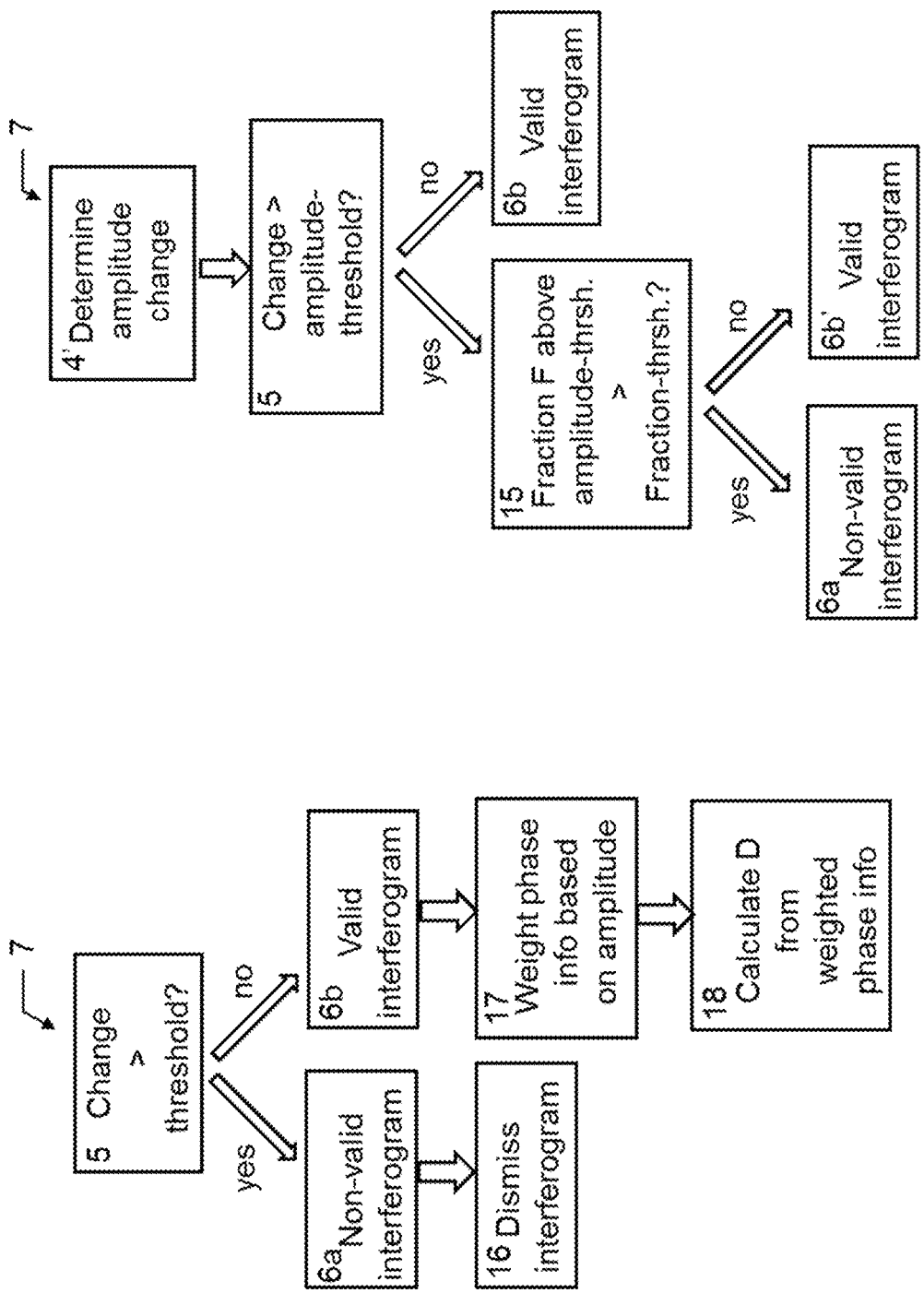

METHOD FOR GAUGING SURFACES WITH CLASSIFICATION OF MEASUREMENTS AS VALID OR NON-VALID

CROSS-REFERENCE TO RELATED APPLICATIONS

This application claims priority to European Patent Application No. 1915606.4, filed on Feb. 7, 2019. The foregoing patent application is herein incorporated by reference.

FIELD OF THE INVENTION

The invention relates to a method for gauging surfaces and a measuring device for this purpose.

BACKGROUND

In many fields of use, there is a need to gauge surfaces of objects and hence also the objects themselves with high accuracy. This applies in particular to the manufacturing industry, for which the gauging and checking of surfaces of workpieces is very important.

For these applications, there is a number of existing measuring devices which are designed for specific tasks and are also designated as coordinate measuring devices or machines. These measuring devices gauge the surface by producing mechanical contact and probing the surface. Examples of this are gantry measuring machines, as described, for example, in DE 43 25 337 or DE 43 25 347. Another system is based on the use of an articulated arm whose measuring sensor arranged at the end of the multipart arm can be moved along the surface. Articulated arms of the generic type are described, for example, in U.S. Pat. No. 5,402,582 or EP 1 474 650.

Approaches for non-contact gauging have already been pursued in the prior art. One approach utilizes white light interferometry for high-precision gauging. Here, the application either employs scanning, i.e. by displacement of the interferometer, and therefore takes place slowly or, in the case of spectrally resolved detection, as a rule with limitation to a measuring range of a few mm.

EP 1 744 119 discloses a system for gauging surfaces using optical coherence tomography and a frequency-modulated source. Here, a fibre ring laser is made tuneable by an acoustically tuneable filter element. The laser radiation is then used for interferometric gauging of surfaces in a common path interferometer, i.e. an interferometer which uses at least partly the same components or beam paths for measuring radiation and reference radiation. The reference distance here is provided by a reflection in the measuring arm of the interferometer. A calibration interferometer is used for calibrating the wavelength.

There are different problems associated with such interferometric measurement methods and devices. An important source of error is the occurrence of so called speckles. The speckle effect originates from the coherent superposition of light with different relative phases reflected from the surface within the resolution cell of the scanning device. Such phase differences occur for example from rough surfaces where the height variations are on the scale of the used wavelength and the lateral size is smaller than the resolution cell. Due to the disturbing speckle effect, the measured profile shows outliers which are not present in the real surface profile. Known methods and devices for interferometric measurement of surfaces are not able to adequately deal with these errors.

BRIEF DESCRIPTION

An object of some embodiments is to provide an improved measuring method or measuring device for gauging surfaces or for determining surface topographies.

A further object is to provide a measuring method or measuring device which adequately deals with, in particular speckle induced, measurement disturbances.

These objects are achieved by the subjects of the independent claims or of the dependent claims, or the solutions are further developed.

Some embodiments of the invention pertain to a method for, in particular industrial, measurement of a surface, preferably according to the principle of Optical Coherence Tomography, whereby based on interferograms, e.g. by analyzing the respective modulation frequency, distances to points of the surface are measured. The method comprises generating a laser beam, emitting the laser beam onto the surface, whereby the laser beam is focused on a point of the surface, receiving at least a part of the laser beam, reflected by a respective point of the surface, and generating an interferogram by superposition of the received laser beam with a reference laser beam.

The method further comprises the step of classifying of measurements as valid or non-valid based on evaluation of phase change and/or amplitude change of a respective interferogram. Said otherwise, a respective interferogram or the distance derived therefrom are classified as valid or non-valid based on a test of phase and/or amplitude change of the respective interferogram. Preferably, the classification serves for sorting out or tagging/marking of measurements disturbed by occurrence of laser light speckles.

Preferably, measurements classified as non-valid are tagged and stored as non-valid or deleted in real-time during measurement. Optionally, a respective interferogram is tagged or deleted before any processing for distance calculation, i.e. non-valid measurements are recognized in due time before any further processing is effected which would be "waste" of processing power as the result is too flawy anyway. As another option, the method comprises generating a profile of the measured surface wherein non-valid measurements/distances are graphically marked. Alternatively or additionally, non-valid distances are excluded from the profile, wherein preferably continuity of the profile is maintained by interpolating between non-excluded measurements.

Optionally, a respective measurement is classified as non-valid if the result of the evaluation is above one or more defined thresholds, wherein preferably the threshold is defined in a calibration procedure with measuring of one or more standard surfaces. For example, if the phase change of a respective interferogram exceeds a defined threshold, the respective interferogram is categorized as non-valid.

As another option, the evaluation comprises searching for a disturbance of phase and/or amplitude of a respective interferogram. Alternatively or additionally, the evaluation comprises determining a degree of fluctuation of the phase and/or amplitude of a respective interferogram. Said otherwise, it is evaluated how much phase and/or amplitude variation or drift is present in a respective interferogram.

As another option, the evaluation comprises comparing a phase and/or amplitude chart of a respective interferogram with an ideal phase and/or amplitude chart. The charts can be embodied as graphs, functions, tables etc. as form of data embodiment for derivation of a deviation of the measured phase and/or amplitude from ideal values.

In a preferred embodiment, the evaluation comprises calculating the unwrapped phase of a respective interferogram, fitting a linear function through the interferogram phase (chart), subtracting the linear function from the phase, calculating the Standard Deviation and classifying the interferogram based on the Standard Deviation. If for example the Standard Deviation exceeds a predefined threshold, the respective interferogram or measured distance is classified as non-valid.

In another preferred embodiment, the evaluation comprises detecting if the amplitude of a respective interferogram is temporarily below an amplitude threshold. The amplitude threshold can be an absolute threshold. Alternatively, the threshold is a relative one, depending on a maximum amplitude of a respective interferogram. As a further option, a respective measurement is classified as non-valid if an interferogram fraction with amplitude below the amplitude threshold is above a fraction threshold. Said otherwise, according to this further option, it is not only evaluated if there is amplitude below the amplitude threshold is present in the interferogram, but it is also evaluated to what extent such low amplitude is present. If for example, the low amplitude is detected but it lasts not longer than a predefined period, the measurement is classified "valid".

Optionally, an amplitude based weighting factor for phase information of a respective interferogram classified as valid is applied for calculating the distance to the point. As a further option, the weighting factor is directly dependent on the amplitude of a respective interferogram and/or is set as zero if the amplitude is below an amplitude threshold. The amplitude threshold for phase weighting may be (but has not to be) identical to the above mentioned amplitude threshold for classification.

Some aspects of the invention also pertain to an interferometric measuring device designed for measuring a surface, in particular according to the principle of Optical Coherence Tomography, the device comprising a laser for generation of a laser beam, a drive for guiding a laser beam emitting measurement head above the surface such that the laser beam is scanning the surface point-by-point, a receiver for receiving at least part of the laser beam reflected by a respective point of the surface and an interferometer for generating an interferogram by superposition of the received laser beam with a reference laser beam as well as a signal processor for measuring a distance to a respective point based on a respective interferogram.

According to some embodiments of the invention, the signal processor, e.g. a Field Programmable Gate Array (FPGA), is configured to classify measurements as valid or non-valid based on an evaluation of phase change and/or amplitude change of a respective interferogram.

Additionally, some embodiments of the invention also pertain to a non-transitory computer program product, comprising program code which is stored on a machine-readable medium, in particular of an interferometric measuring device according to the invention, and having computer-executable instructions which when executed cause a computer to perform the measurement method according to the invention.

Some aspects of the present invention allows advantageously to identify and sort out interferograms resp. distances derived therefrom which have (too much) errors, in particular errors resulting from speckles. Thus, invalid measurements are dismissed from the beginning and do not have to be erased afterwards. A resulting measured surface profile does not show any (speckle induced) outliers like resulting from methods/devices of the prior art resp. such outliers can already be marked as flawy measurements during creation of the profile.

BRIEF DESCRIPTION OF THE DRAWINGS

A method according to some aspects of the invention and a measuring device according to some aspects of the invention for gauging surfaces are described or illustrated in more detail below, purely by way of example, with reference to working examples shown schematically in the drawing. Specifically.

FIG. 3 shows a further development of a method for classification of interferograms; and FIG. 4 shows another further development of a method for classification of interferograms.

DETAILED DESCRIPTION

FIGS. 1*a-f* illustrate a first example of an interferometric measuring device 1 and an according method for measuring of a surface 24, whereby in the example, the measurement is based on the principle of Swept Source Optical Coherence Tomography (SS-OCT). Although the herewith in more detail described device and method are based on swept-source OCT the following aspects are applicable also for Fourier-domain OCT consisting of a white light source in combination with a spectrometer and line sensor on the detection side. The device 1 is designed for usage in the intended field of industrial coordinate measuring devices with free-beam measurements of a few cm using compact probe heads having diameters in the region of ruby spheres. In this frequency-modulated interferometry, a source which should as far as possible permit broadband tuning in a short time is used. Moreover, narrow-band characteristics with a coherence length of a few cm are required. The tuning of the source is e.g. referenced via a calibration interferometer whose length is known very precisely.

Figure 1A:
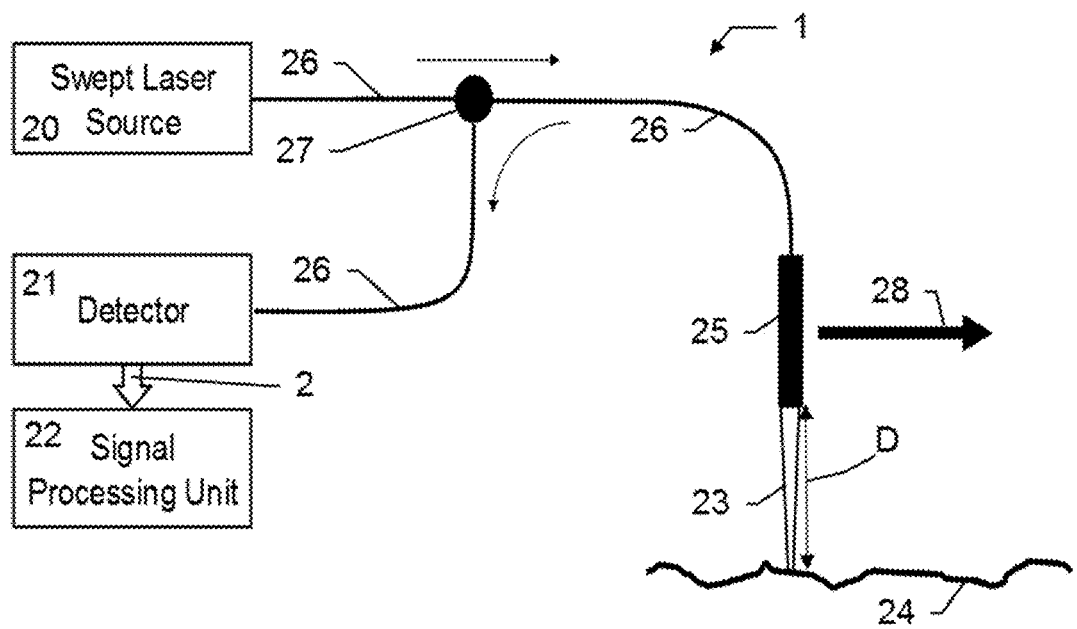
FIG. 1*a-f* show a first example of an interferometric measuring device and an according method for measuring of a surface with classification of measurements as valid or non-valid.

In FIG. 1*a*, a frequency modulated laser (swept source) 20 generates a laser beam 23 which is guided by optical fibers 26 to a measurement head 25 and emitted therefrom at the surface 24 to be measured. The laser source 20 is for example in the form of a fibre ring laser having an optical semiconductor amplifier as an amplifying medium and a tuneable filter element. If higher repetition rates are desired in the measurement, the fibre ring laser can be extended by a fibre length of several kilometres, the repetition rate corresponding to the inverse of the transit time of the light in the fibre ring. As a further possibility for setting up the laser source 20, it is also possible to use an external cavity having a dispersive element, for example a grating or prism in combination with a moveable optical surface, e.g. a polygonal mirror, for fast tuning of the laser wavelength for the laser resonator. The tuneable element may be formed, for example, as a Fabry-Perot filter or as an acoustically tuneable fibre Bragg grating. Further elements are Semiconductor Lasers, tunable VCSELs (Vertical cavity surface emitting laser), distributed feedback lasers (DFBs), optical couplers or insulators, the use and integration of which in such a system are known to the person skilled in the art.

The laser beam 23 is focused at a spot or point on the surface 24. The back reflected light is superimposed with light from a fixed reflector which serves as a local oscillator (e.g. the last optical surface of the measurement head 25). Due to the modulation, light with different frequencies interferes depending on the distance D to the object 24 and the associated time delay. This results in a temporal amplitude modulation or interferogram whose frequency (beat frequency) is directly related to the distance D to a respective point of the surface 24.

Figure 1B:
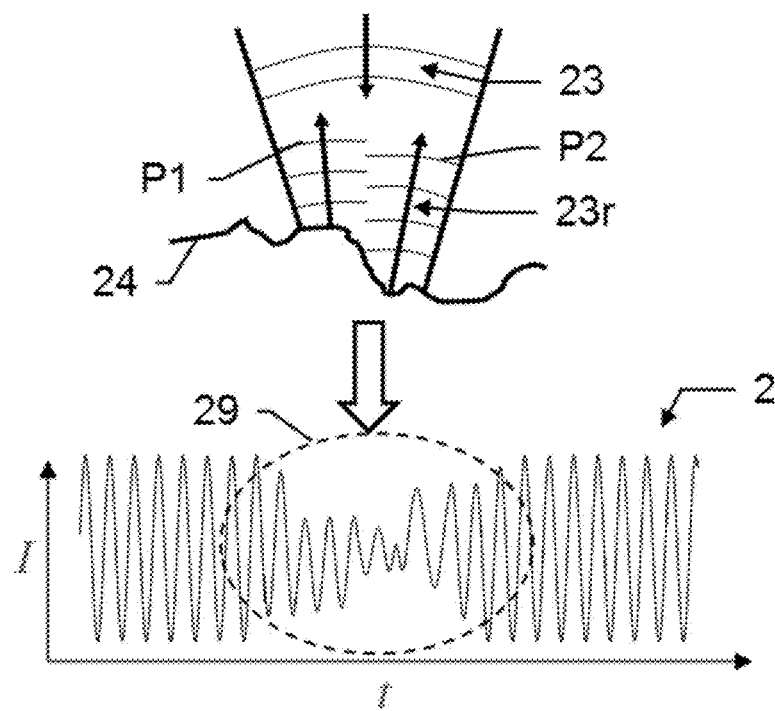

The resulting temporal amplitude modulation or interferogram is detected by a photo detector 21 and converted to a digital signal resp. digitalized interferogram 2 (see also FIG. 1b). Such an interferogram can be (completely) continuous. Alternatively, an interferogram comprises a couple of discrete segments, for example in devices with an DFB-array as swept light source. Each interferogram segment or "sub"-interferogram is assigned to the tuning-region of a particular DFB. In any case, for subsequent evaluation (classification of interferograms/measurements) as described below, a respective interferogram is considered as a whole, wherefore for example in case of discrete segments, the segments are stitched together before evaluation. Said otherwise, the signals e.g. from different tuning-regions are first combined.

A signal processing unit 22, e.g. a FPGA or some other form of computer processor, provides the calculation of the distance D to the target surface 24 (more precisely: the targeted surface point) by analyzing the modulation frequency of the respective digitalized interferogram. In other words, the calculation of the distance D is primarily based on the phase information of a respective interferogram 2.

By moving the laser spot over the surface 24 i.e. scanning (arrow 28), a plurality of surface points and thus the height variation or profile of the surface 24 is measured. However, the measurement can be disturbed, i.e. the measured distance deviates from the real distance D, which will be explained in more detail with respect to FIG. 1b.

Referring to FIG. 1b, a measurement disturbance caused by speckles, i.e. position-dependent intensity variations, in coherent observation, is described. In the upper part of FIG. 1b, it is shown that the spot of the laser beam 23 on the surface 24 has always a certain size which corresponds to the resolution of the sensor defined by the PSF (point-spread-function) of the lens. In case of a rough surface 24, height variations can occur within the resolution cell. The light 23r reflected from different parts of the illuminated area is sent to the detector 21 with different phase (in the example two phases P1 and P2 are illustrated). Depending on their relative phase the light can interfere constructively or destructively. Furthermore, the phase of the superimposed light 23r can differ significantly from the phase of the single parts. Said otherwise, this so called speckles originate from the coherent superposition of light 23r with different relative phase P1, P2 reflected from the surface 24 within the resolution cell of the scanning device. Such phase differences occur for example from rough surfaces 24 where the height variations are on the scale of the used wavelength and the lateral size is smaller than the resolution cell.

The resulting interferogram 2 (lower part of FIG. 1b), outputted by the detector 21 is disturbed (area graphically marked by circle 29) and accordingly, the signal processor 22 calculates (or would calculate) a wrong distance. With the presented invention, such disturbed measurements are recognized which is exemplified with respect to FIG. 1c.

Figure 1C:
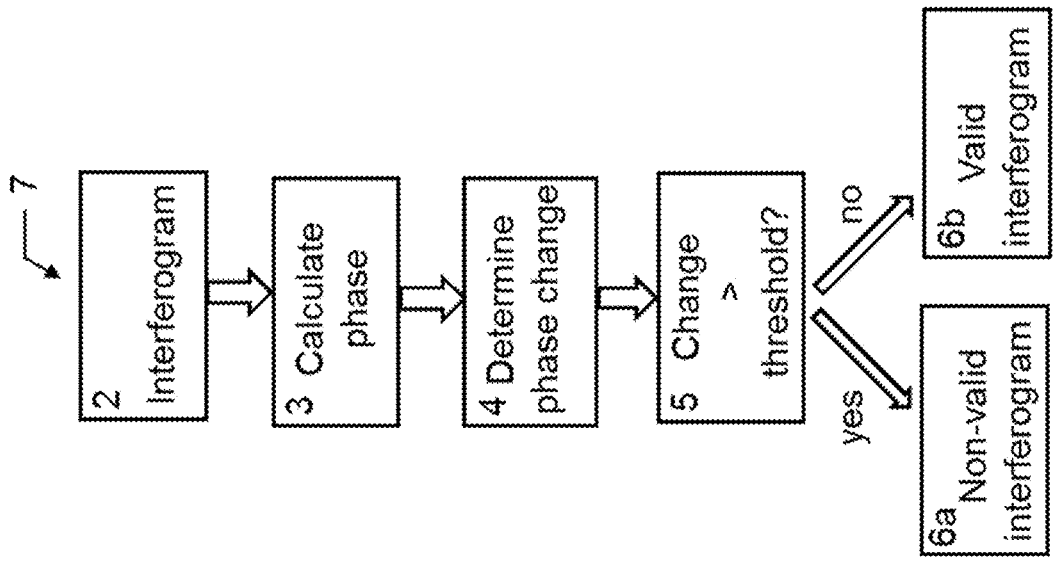

FIG. 1c shows an exemplary procedure for classification 7 of measurements as valid or non-valid. First, after generation of the interferogram 2, the phase of the interferogram is calculated (step 3). Thereafter, phase change is determined (step 4). The phase change 4 serves as indicator of disturbance. If the phase change 4 is above a certain threshold (tested in evaluation step 5), the interferogram resp. the measurement (signal) is classified as non-valid (6a), i.e. (too much) disturbed. Otherwise, the measurement is classified as valid (6b). Such a procedure is further exemplified with respect to FIG. 1d.

Figure 1D:
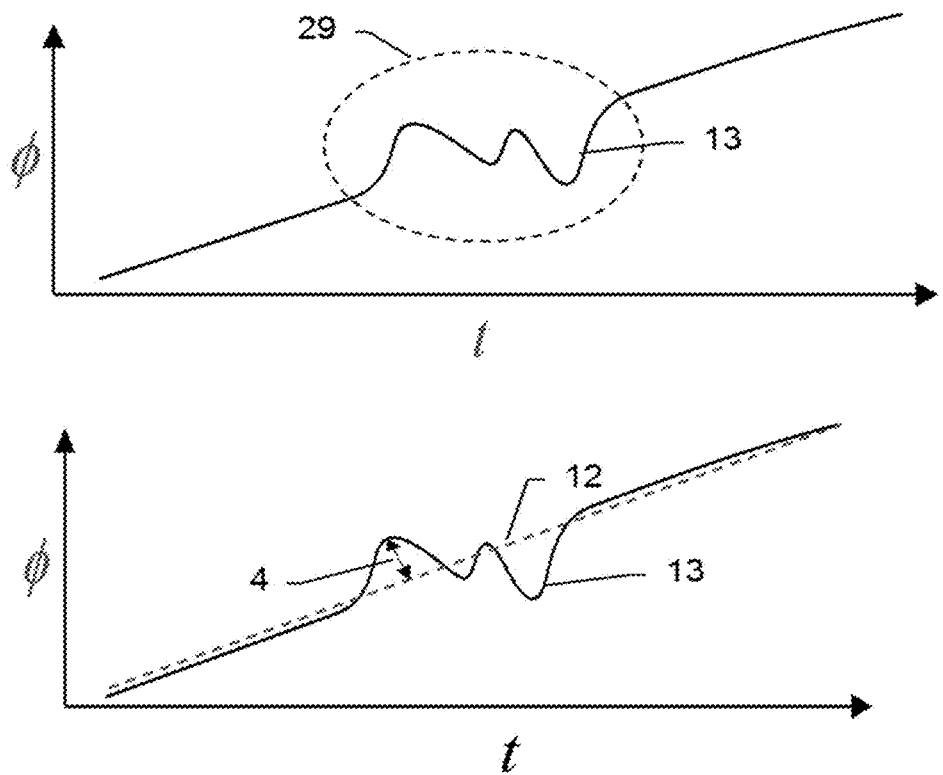

FIG. 1d shows in the upper part a chart of calculated (unwrapped) phase D (displayed over time) of a measured interferogram 2. Ideally, without any disturbance, the phase line 13 would be a straight line. In case of a speckle disturbance the phase 13 deviates from the ideally linear function (marked by circle 29). The phase change 4 is determined by fitting a linear function 12 through the interferogram phase 3 resp. phase line 13, subtract the linear function 12 from the phase 13 and calculate the Standard Deviation of the phase D, this is a measure for the deviation (indicated by arrow 4) of the phase 3 from a linear function 12. By calculation of the Standard Deviation, in this example the phase change is determined, i.e. the Standard Deviation serves as a measure for phase change. Instead of using functional representations of the phase as shown, the comparison of the measured chart with an ideal chart is based on tables.

If the Standard Deviation 4 is larger than an adjustable threshold, then the interferogram 2, and also the resulting distance value, are classified or recognized as "invalid". The value of the threshold can e.g. be determined by scanning tests on a typical rough surface 24. Measurements classified as non-valid are tagged as non-valid or dismissed (deleted), preferably in real-time during measurement, i.e. either stored with a marker or completely removed, which is exemplified in more detail with respect to FIG. 1e.

Figure 1E:
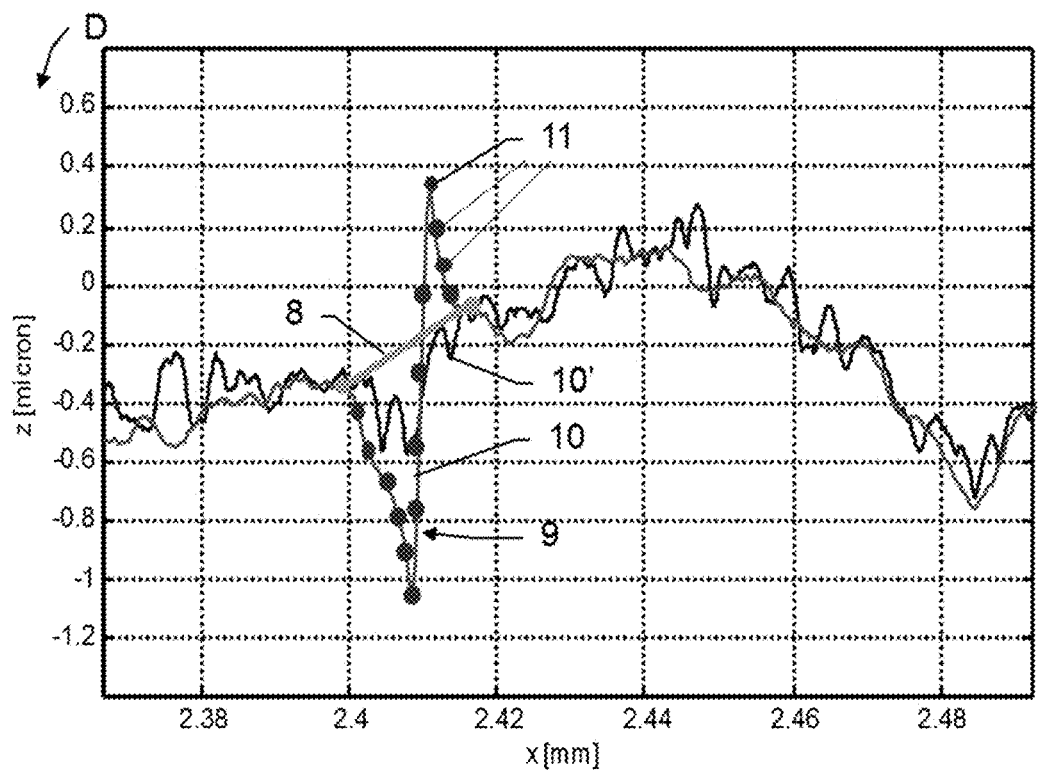

FIG. 1e shows an exemplary final result of the measurement classification. The measured distances D or the measured profile 10 are shown, (grey or bright line). Due to the disturbing speckle effect, the measured profile 10 shows outliers 9 which are not present in the real distances resp. the real surface profile 10' (black or dark line). Such outliers 9 have a typical shape similar to a pole in mathematical functions.

As these disturbances have been recognized by the previous evaluation 5 resp. the according measurements have been classified as non-valid, the distance values which are declared as "invalid" can be marked in the profile plot, indicated in the figure by dots 11. If for example roughness parameters like Ra or Rz shall be determined from the profile 10, those invalid points can be excluded from the calculation. Another possibility is to interpolate the profile 10 between adjacent "valid" distance points in order to obtain (or maintain) a continuous profile 10 without speckle disturbances, which is in FIG. 1e indicated by the thick straight line 8. In embodiments of the method wherein non-valid measurements or distances are not marked in the surface plot, it is optionally waived to process the underlying interferograms 2 at all after they are classified as non-valid. Hence, they are not subject to distance calculation at all and optionally even completely removed by the processing unit, which can spare processing time and power and in case of complete and quick deletion save storage.

In either way, advantageously, the disturbances, primarily those by speckles, do not effect the final measurement result 10. Hence, the presented method provides analyses of phase change as a quality marker to find and tag distance values of disturbed interferograms.

Figure 1F:
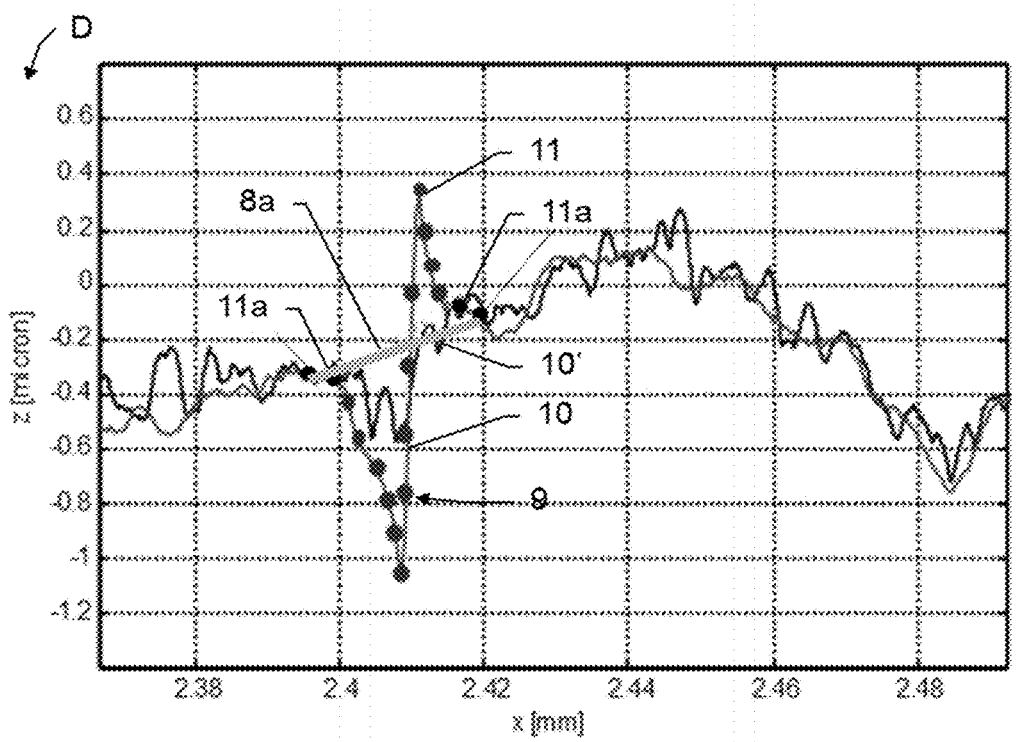

FIG. 1f shows an additional optional step. The figure is based on FIG. 1e and shows additional measurement points 11a "before" and "after" the previous invalid measurement points 11 are considered "invalid" though they have not been classified as "invalid" in the previous steps. In difference to the previous invalid points 11a, these additional invalid points 11a are considered as such because of their neighborhood to the initial invalid points 11. Said otherwise, the invalid region of the original points 11 is "artificially" broadened with the additional points 11a. This optional step serves for example to guarantee that a speckle underlying the disturbance is completely considered, without any boundary speckle zone omitted.

As criterion, for example each 10, 100 or so measurements "before" and "after" the original "invalid" measurements is declared "invalid", too, or a margin of the original invalid region is declared "invalid, e.g. 1% or 2.5% of the invalid profile at one or each end.

In accordance, a larger interpolation zone 8a than in the previous FIG. 1e is optionally established, comprising both the zone of values 11 initially classified as "invalid" as well as the zones of values 11a considered "invalid" due to their proximity to the initial values 11.

Figure 2A:
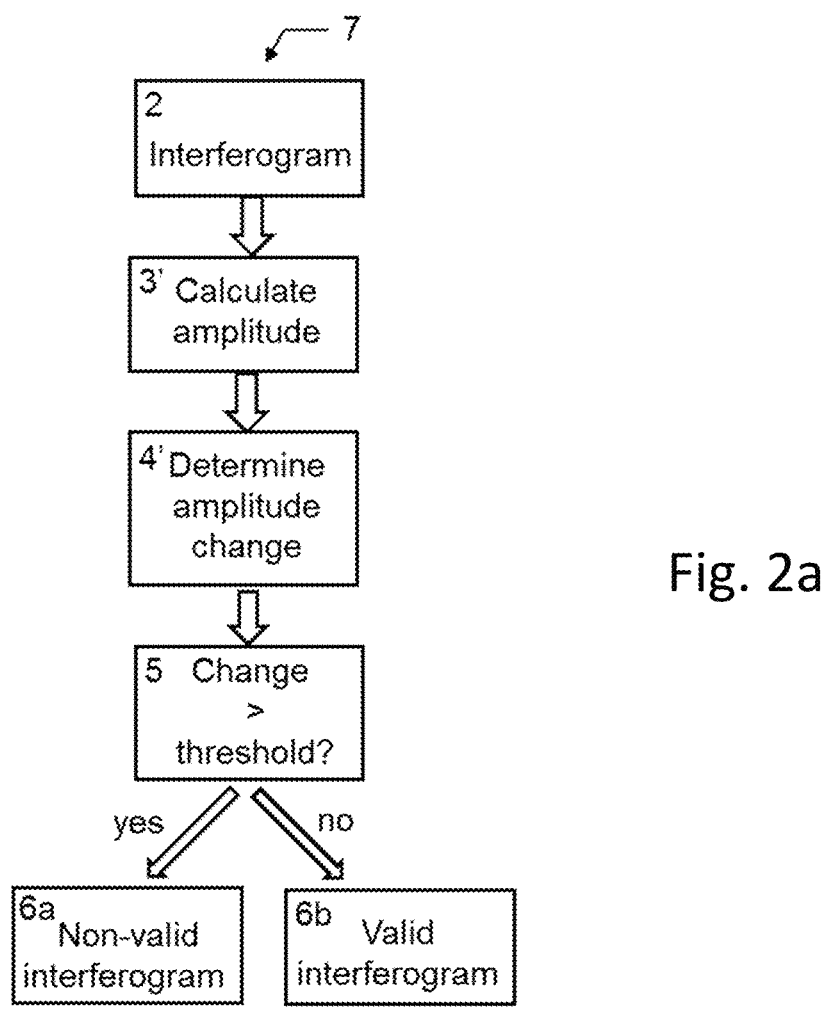
FIG. 2*a,b* show another example of a method for classification of interferograms.

FIG. 2a shows another example of a method for classification 7 of interferograms 2. In a step 3', the amplitude of the interferogram 2 is calculated. Next, in step 4', any change of amplitude is determined. Amplitude fluctuation serves as indicator for validness. If the change or variation is above a certain threshold, tested in step 5, then the interferogram 2 is classified as non-valid (step 6a). Said otherwise, if a too high fluctuation of amplitude is detected, e.g. a too strong drop of amplitude, then the respective measurement is declared "invalid". If on the other hand there is no drift above the threshold, then the interferogram 2 is regarded as valid (step 6b).

A test-threshold can be completely predefined, i.e. a value is predetermined as such. Alternatively, the test-threshold is semi-predefined in depending on a measured value of the interferogram, e.g. the maximum amplitude present in the interferogram or the general degree of phase change (gradient of line 12 in FIG. 1d). For example, the threshold is semi-predefined as a change which amounts to 25% or 50% of the maximum amplitude.

Figure 2B:
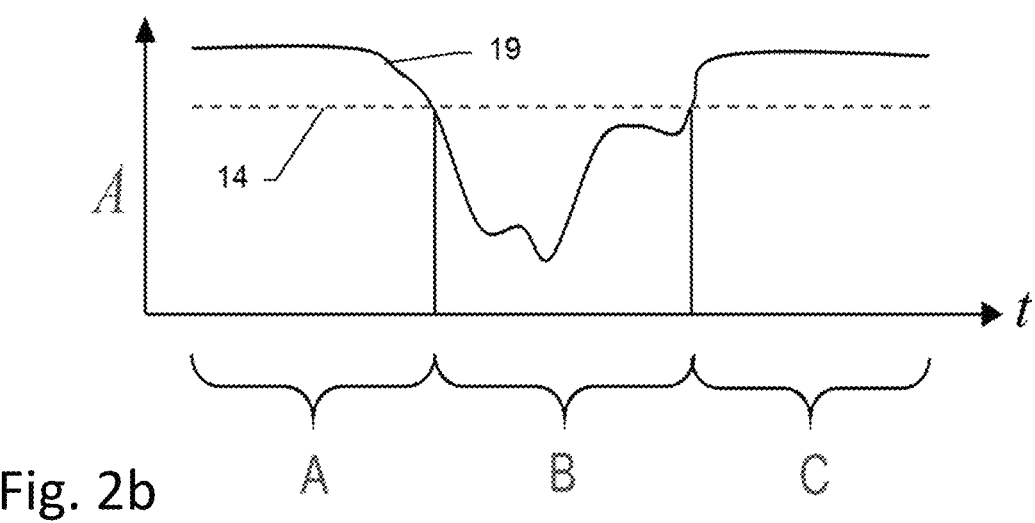

FIG. 2b shows a further exemplified illustration of an amplitude based classification. Shown is the amplitude A of an interferogram to be classified. The amplitude A is not unvarying but there is significant change (here in the middle, indicated by region B). Such a temporally amplitude drop down is e.g. caused by speckles. The interferogram shows that there is amplitude as low that it falls below a defined amplitude threshold 14 which serves as an "inverse" amplitude change threshold (i.e. if there is amplitude below the amplitude threshold 14, this is regarded as exceeding an according amplitude change threshold). Thus, the interferogram resp. the measurement is classified as non-valid.

Instead of an amplitude value as a threshold 14 as shown, e.g. a threshold test based on a standard deviation of the measured amplitude chart 19 to an ideal amplitude chart is effected, comparable to the method as shown in FIG. 1d. As another option, not the curve 19 but its derivative is compared to a threshold, e.g. the gradient must not exceed a certain value.

In another procedure, illustrated by FIG. 3, the classification 7 comprises not only a test if there is amplitude below an amplitude threshold (14 in FIG. 2b) but additionally it is tested if such low amplitude section (B in FIG. 2b) accounts for a too big part of the whole interferogram. FIG. 3 is based on FIG. 2a whereby steps 2 and 3' are not shown for reasons of more compact illustration.

As in FIG. 2a, in step 4' any amplitude change is determined and in step 5, it is verified if there is amplitude change above an amplitude threshold. If "no", the measurement is classified as a valid measurement (6b).

If there is change above the first threshold, then it is further evaluated if the fraction or portion of amplitude change above the first threshold is above a second threshold/fraction threshold (step 15). Only if the second threshold is exceeded, the measurement is classified as non-valid (6a). Otherwise, the amplitude change, although above the amplitude threshold, is regarded as not rendering the measurement invalid (step 6b').

Said otherwise, it is not only looked if there is significant amplitude change but also if in the case of such major amplitude variation this change concerns at least a predefined portion of the interferogram. Only if high amplitude change is detected that prevails a defined period, then the interferogram is classified as non-valid (6a). Said the other way round, if amplitude change above the first threshold is present but the change lasts only a period shorter than a predefined period, the measurement is still regarded as valid as the amplitude change is significant but concerns only a portion of the interferogram which is regarded as a negligible portion.

With respect to FIG. 2b, the method according to FIG. 3 is further exemplified. In the example of FIG. 2b, region B shows amplitude below the amplitude or first threshold 14 as described above. Regions A and C show amplitude values above the first threshold 14. Then, the fraction F of amplitude change above the first threshold 14 is calculated as $$F=\text{size}(B)/\text{size}(A+B+C).$$

If the fraction F is above a defined fraction threshold, then the interferogram is classified as non-valid. In other words, if the size B amounts to more than a defined portion of the size of the whole interferogram, the interferogram is tagged as invalid.

The values of the described thresholds are e.g. determined by scanning tests on a typical rough surface. The described procedures are optionally combined to achieve higher robustness, e.g. there is test with respect to phase change and additionally test with respect to amplitude change. Both evaluations can be performed independently and if either one of both results in "non-valid", the measurement is classified as "non-valid". Or, these test are performed in sequence, for example first there is a test for amplitude change as described in FIG. 2b, and interferograms 2 classified as "non-valid" because of amplitude change are tested for phase change. If the phase change results in "non-valid" classification, too, the measurement is finally classified as "non-valid".

Otherwise, the measurement is classified as "valid". As an alternative, in case of divergent classification results with respect to amplitude and phase, amplitude and/or phase classification is done a second time, this time e.g. with more refined thresholds.

FIG. 4 illustrates a further development of the method of classification 7 of interferometric measurements. FIG. 4 is based on FIG. 1b or 2a whereby steps 2, 3/3' and 4/4' are not shown for reasons of more compact illustration. In this further development, the detection of phase and/or amplitude disturbances in the interferograms is not only used to declare an interferogram, and also the resulting distance value, as invalid. It is also used to improve the robustness of "valid" distances, e.g. in case of (weaker) speckles disturbances.

In this further development according to FIG. 4, after step 5 wherein the phase and/or amplitude change is used for classification of interferograms, a respective interferogram classified as non-valid (step 6a) is dismissed or ignored (step 16). That means an interferogram recognized as non-valid is not used for calculation of a distance D to a point of the measured surface.

On the other hand, an interferogram classified "valid" is further processed in that the phase information is weighted, based on the amplitude of the respective interferogram (step 17). This is particularly advantageous in classifications 7 that are based on amplitude change evaluation (e.g. as described with respect to FIG. 2a,b) as in these cases the amplitude is calculated/processed anyhow. With the time dependent weighting factor w(t) the phase information $\Phi_{proc}$ to be used for the distance processing is calculated from the raw phase information $\Phi_{raw}$ according to:

$$\Phi_{proc}(t) = w(t)\Phi_{raw}(t)$$

The weighted or processed phase information $\Phi_{proc}$ then is used for calculation of the distance D to the underlying surface point (step 18).

Different weighting methods are applicable, whereby the weighting factor is preferably directly derived from the amplitude. As one option, the weighting factor is directly derived from the amplitude in that the amplitude itself is used as a weighting factor for the phase:

$$w(t) = A(t)$$

Another option for directly deriving the weighting factor from the amplitude is to use the power k of the amplitude as a weighting factor for the phase:

$$w(t) = A(t)^k,$$

whereby k is e.g. a real number smaller or greater than 1.

As a further option, phase information is only taken into account if the respective amplitude is above an amplitude threshold (e.g. threshold 14 in FIG. 2b). Said otherwise, phase information is excluded from distance processing where the amplitude is below the amplitude threshold.

For example, regions of "valid"-interferograms below the above described amplitude threshold (e.g. region B in FIG. 2b) are excluded from calculation of the distance (or only used with a lower power k than for the other amplitude regions, e.g. regions A and C in FIG. 2b). Said otherwise, e.g. in a classification 7 as shown in FIG. 3, the gained knowledge about the fraction F/region B is used to eliminate (or at least diminish) the influence of the respective phase information on calculation of the distance to the surface point for "valid" interferograms showing such (temporarily minor) amplitude fluctuation.

The combination of this phase weighting method with the speckle detection for a whole measurement sweep is particularly advantageous. For this, strongly disturbed interferograms are tagged as "invalid" distances. Those distances can be excluded or interpolated like for example described with respect to FIG. 1e. The calculation of the remaining "valid" distances make use of one of the phase weighting methods described above which reduces the disturbing effect of weaker speckles. This approach drastically increases the overall robustness of the profile measurement.

A skilled person is aware of the fact that details, which are here shown and explained with respect to different embodiments, can also be combined in other permutations in the sense of the invention if not indicated otherwise.

What is claimed is:

1. A method for measuring a surface, the method comprising:
    generating a laser beam;
    emitting the laser beam onto the surface;
    receiving at least a part of the laser beam, reflected by a respective point of the surface;
    generating an interferogram by superposition of the received laser beam with a reference laser beam for measuring a distance to a respective point based on a respective interferogram; and
    classifying the respective interferogram or a measured distance derived therefrom as non-valid or valid based on an evaluation of a phase change or an amplitude change of the respective interferogram.

2. The method according to claim 1, wherein the measured distance is classified as non-valid if the result of the evaluation is above one or more defined thresholds.

3. The method according to claim 1, wherein the evaluation comprises searching for a disturbance of the phase or the amplitude of the respective interferogram.

4. The method according to claim 1, wherein the evaluation comprises determining a degree of fluctuation of the phase or amplitude of the respective interferogram.

5. The method according to claim 1, wherein the evaluation comprises comparing a phase chart or amplitude chart of the interferogram with an ideal phase chart or amplitude chart.

6. The method according to claim 1, wherein the evaluation comprises:
    calculating the phase of the respective interferogram,
    fitting a linear function through the phase,
    subtracting the linear function from the phase,
    calculating a Standard Deviation of a result of the subtracting the linear function from the phase,
    classifying the measured distance based on the Standard Deviation.

7. The method according to claim 1, wherein the evaluation comprises detecting if the amplitude of the respective interferogram is temporarily below an amplitude threshold.

8. The method according to claim 7, wherein the measured distance is classified as non-valid if an interferogram fraction with an amplitude below the amplitude threshold is above a fraction threshold.

9. The method according to claim 1, further comprising:
    calculating the distance to the point by applying an amplitude based weighting factor for phase information of the respective interferogram which has been classified as valid.

10. The method according to claim 9, wherein the weighting factor:
    is directly dependent on the amplitude, or
    is set as zero if the amplitude is below an amplitude threshold.

11. The method according to claim 9, wherein the measured distance which has been classified as non-valid is tagged and stored as non-valid or deleted in real-time during the classification.

12. The method according to claim 1, wherein the classification serves for sorting out or tagging of measurements disturbed by occurrence of laser light speckles.

13. The method according to claim 1, further comprising:
generating a profile of the measured surface wherein a non-valid interferogram:
is excluded from the profile, or
are graphically marked.

14. A non-transitory computer program product, comprising program code which is stored on a machine-readable medium of an interferometric measuring device and carries out the method of claim 1.

15. An interferometric measuring device designed for measuring a surface, the device comprising:
a laser for generating a laser beam;
a drive for guiding a laser beam emitting measurement head above the surface such that the laser beam scans the surface point-by-point;
a receiver for receiving at least part of the laser beam reflected by a respective point of the surface;
an interferometer for generating an interferogram by superposition of the received laser beam with a reference laser beam;
a signal processor for measuring a distance to a respective point based on a respective interferogram and classifying the respective interferogram or the measured distance derived therefrom as non-valid or valid based on an evaluation of a phase change or an amplitude change of the respective interferogram.

* * * * *